(12) United States Patent
Peace

(10) Patent No.: US 9,658,625 B2
(45) Date of Patent: May 23, 2017

(54) ADD-ON CHAMBER FOR IMPROVED RESPONSE OF GAS PRESSURE REGULATORS

(71) Applicant: Sensus USA Inc., Raleigh, NC (US)

(72) Inventor: Daniel Willis Peace, Punxsutawney, PA (US)

(73) Assignee: Sensus USA Inc., Raleigh, NC (US)

( * ) Notice: Subject to any disclaimer, the term of this patent is extended or adjusted under 35 U.S.C. 154(b) by 270 days.

(21) Appl. No.: 14/324,975

(22) Filed: Jul. 7, 2014

(65) Prior Publication Data

US 2016/0004260 A1 Jan. 7, 2016

(51) Int. Cl.
*G05D 16/02* (2006.01)
*G05D 16/06* (2006.01)

(52) U.S. Cl.
CPC ......... *G05D 16/02* (2013.01); *G05D 16/0697* (2013.01)

(58) Field of Classification Search
CPC ................................................ G05D 16/0602
USPC ............................ 137/505–505.47, 906, 907
See application file for complete search history.

(56) References Cited

U.S. PATENT DOCUMENTS

| 1,484,394 | A | * | 2/1924 | Jenkins | G05D 16/0619 |
| | | | | | 137/505.3 |
| 2,002,884 | A | * | 5/1935 | Deming | G05D 16/0602 |
| | | | | | 137/505.12 |
| 2,685,300 | A | * | 8/1954 | Hammon | G05D 16/0602 |
| | | | | | 137/382 |
| 2,731,026 | A | * | 1/1956 | Hughes | G05D 16/0694 |
| | | | | | 137/116.5 |
| 3,032,054 | A | * | 5/1962 | Irwin | G05D 16/0694 |
| | | | | | 137/116.5 |
| 3,443,583 | A | * | 5/1969 | Floyd | G05D 16/0602 |
| | | | | | 137/315.04 |
| 3,623,506 | A | * | 11/1971 | Bonner | F16K 17/22 |
| | | | | | 137/461 |

(Continued)

FOREIGN PATENT DOCUMENTS

DE 40 12 801 A1 10/1991
FR 1 428 174 2/1966

(Continued)

OTHER PUBLICATIONS

Office Action issued Dec. 1, 2015 in European Patent Application No. 15175509.7.

(Continued)

*Primary Examiner* — Craig Schneider
*Assistant Examiner* — Daniel P Donegan
(74) *Attorney, Agent, or Firm* — Oblon, McClelland, Maier & Neustadt, L.L.P.

(57) ABSTRACT

A gas pressure regulator regulates a pressure of a gas system. The gas pressure regulator includes a first chamber, a first diaphragm which separates the first chamber into a first compartment and a second compartment, a second chamber, with a second diaphragm separating the second chamber into a third compartment and a fourth compartment, the fourth compartment being connected to, and in communication with, the first compartment of the first chamber. A movement of the first diaphragm causes a corresponding movement of the second diaphragm, and a change in the volume of the fourth compartment.

18 Claims, 7 Drawing Sheets

(56) References Cited

U.S. PATENT DOCUMENTS

| | | | | |
|---|---|---|---|---|
| 3,711,236 | A * | 1/1973 | Kinsella | F23Q 9/14 236/68 D |
| 3,722,536 | A * | 3/1973 | Hill | G05D 16/0602 137/505.38 |
| 4,067,355 | A * | 1/1978 | St. Clair | G05D 16/0688 137/456 |
| 4,497,339 | A * | 2/1985 | Gruner | F21L 19/00 137/495 |
| 5,009,245 | A * | 4/1991 | Esola | G05D 16/0683 137/116.5 |
| 5,427,143 | A * | 6/1995 | Maracchi | F17D 1/04 137/312 |
| 6,019,121 | A * | 2/2000 | Uehara | G05D 16/0672 137/116.5 |
| 7,487,792 | B2 * | 2/2009 | Yoshino | F16K 17/196 137/504 |
| 8,156,958 | B2 * | 4/2012 | Zhang | G05D 16/0683 137/269 |
| 8,256,452 | B2 * | 9/2012 | Hawkins | G05D 16/0688 137/505.46 |
| 8,336,574 | B2 * | 12/2012 | Kranz | G05D 16/0683 137/484.4 |
| 8,500,092 | B2 * | 8/2013 | Quijano | F16K 25/00 137/505 |
| 8,534,315 | B2 * | 9/2013 | Mason | G05D 16/0672 137/315.05 |
| 2009/0173399 | A1 * | 7/2009 | Hanada | G05D 7/0133 137/503 |
| 2016/0004260 | A1 * | 1/2016 | Peace | G05D 16/0697 137/14 |

FOREIGN PATENT DOCUMENTS

| | | |
|---|---|---|
| GB | 447519 | 5/1936 |
| GB | 761 480 A | 11/1956 |
| GB | 1 220 467 A | 1/1971 |

OTHER PUBLICATIONS

Extended Search Report issued May 3, 2016 in European Patent Application No. 15175509.7.

Colombian Office Action issued Jul. 28, 2015 in Patent Application No. 15-152.307(without English Translation).

European Communication pursuant to Rules 70(2) and 70a(2) EPC and reference to Rule 39(1) EPC issued Jun. 6, 2016 in Patent Application No. 15175509.7.

* cited by examiner

ADD-ON CHAMBER FOR IMPROVED RESPONSE OF GAS PRESSURE REGULATORS

CROSS-REFERENCE TO RELATED APPLICATIONS

This application is related to U.S. Pat. No. 8,104,397, issued on Jan. 31, 2012, the entire content of which is incorporated in the present document by reference.

BACKGROUND

This invention relates to mechanical self-operating spring-loaded commercial regulators for controlling gas pressure delivery. Pressure regulators reduce and/or maintain pressure levels to adjust gas pressure delivery over a range of flow demands.

The development and introduction of complex, computer controlled, operating systems for gas consuming devices with rapid controls has put new and extreme demands upon existing gas pressure regulators.

High efficiency, commercial boilers may use features such as pilotless electronic ignition, snap-acting valves, forced suction of combustion air and fuel gas mixture, and fast modulating fuel demands over wide ranges of flows, requiring pressure response times of fractions of second. Conventional gas pressure regulators may not have been designed to accommodate these previously unforeseen pressure response times.

However, conventional gas pressure regulators, which have effectively served in a range of applications for the past 50 years or more, may still be applied, even for these new and challenging applications. This is in part due to their ease of installation in tight quarters and in multiple orientations, their simple internal self-control, low maintenance design and construction, long reliable service life, and economical cost.

SUMMARY

In light of the problems noted above, it may be desirable to obtain a device which can address in-service operational problems associated with existing gas supply regulators which may not be able to respond quickly enough to complex operating systems for gas consuming devices.

A gas pressure regulator for regulating a pressure of a gas system includes a first chamber, a first diaphragm separating the first chamber into a first compartment and a second compartment, and a second chamber also known as an add-on chamber, with a second diaphragm separating the second chamber into a third compartment and a fourth compartment. The fourth compartment is connected to, and in communication with, the first compartment of the first chamber. A movement of the first diaphragm causes a pressure change in the first compartment. The movement of the first diaphragm also causes a corresponding movement of the second diaphragm that changes a volume of the fourth compartment.

BRIEF DESCRIPTION OF THE DRAWINGS

The characteristics and advantages of an exemplary embodiment are set out in more detail in the following description, made with reference to the accompanying drawings.

DETAILED DESCRIPTION OF PREFERRED EMBODIMENTS

One object and feature of an exemplary embodiment described herein is to provide a chamber for improved response of pressure regulators.

An exemplary embodiment of a second chamber increases the freedom of response of the system, compared to the freedom of response of the pressure regulator alone, and allows the system to react more quickly to instantaneous pressure changes. One advantage of an exemplary second chamber described herein is the ability to improve the system response and maintain stable operating conditions without oversizing the vent lines, and incurring the associated costs and required tuning of regulator and venting mechanism components.

An exemplary second chamber according to the invention can be advantageously sized to minimize the additional height required, and utilize the existing space around the pressure regulator spring tower. Another advantage of the exemplary second chamber described herein is the ability to provide access to the main spring via the safety cap, to set the pressure levels.

An exemplary embodiment of a second chamber safely improves the response of a gas pressure regulator, especially for high flow capacity commercial and industrial regulators used for fast acting gas fired space and water heaters. An exemplary embodiment of the second chamber may also allow faster response of the gas pressure regulator to rapid changes in pressure and flow demands, while maintaining safe and stable operation.

These and other objects, advantages, and features of the exemplary second chamber described herein will be apparent to one skilled in the art from a consideration of this specification, including the attached drawings.

A pressure regulator may be used to supply a gas at a steady controlled pressure, thereby controlling gas pressure delivery over a range of flow demands. For example a pressure regulator may meet a varying demand flow of fuel gas from burners, heaters, and process equipment for an array of residential, commercial, and industrial applications.

A pressure regulator, such as a mechanical self-operating spring-loaded pressure regulator, may include gas flow controlling elements, a pressure responsive element, a pressure reference element, and safety elements.

Figure 1:
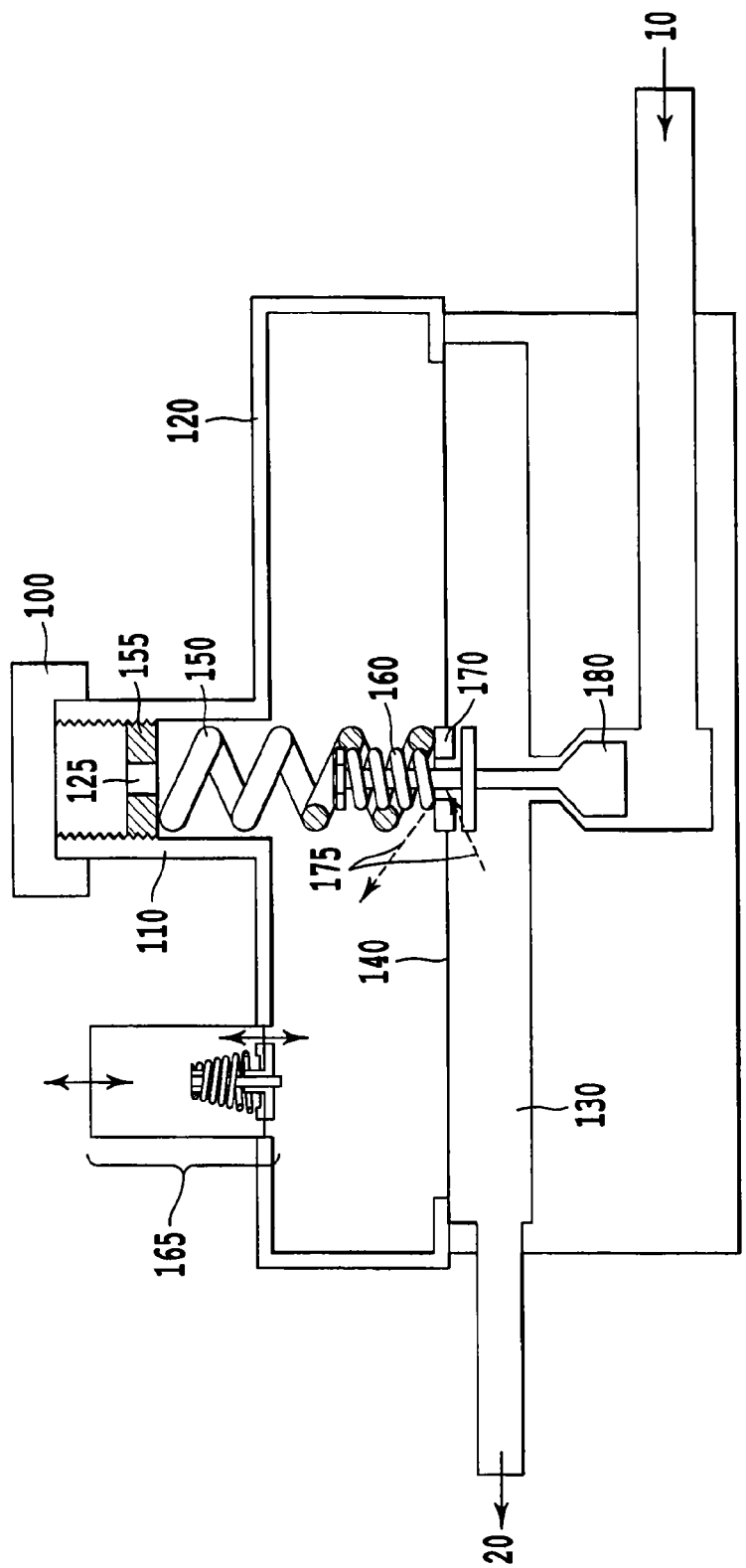
FIG. 1 is a schematic cross-sectional view of a gas pressure regulator according to an embodiment of the invention.

Referring to FIG. 1, an exemplary embodiment of a pressure regulator includes a chamber with a membrane or diaphragm 140 separating the chamber into a first compartment 120 and a second compartment 130. In a non-limiting example, the second compartment is a pressurized compartment, and the first compartment is an unpressurized or atmospheric side compartment. The flexible diaphragm acts as a pressure responsive element, supported and sealed at its perimeter, and coupled to a valve 180.

A spring tower 110 encasing a spring 150 extends through the unpressurized compartment, and is closed off by a safety cap 100. The spring and spring tower may provide a pre-set spring force opposing the diaphragm. The safety cap seals the case and ensures that no gas escapes the pressure regulator in the event of a diaphragm break. The safety cap also allows for access to the spring for a set-point adjustment by turning, thus moving downward or upward, the internal threaded collar 155, with a central opening 125. The movable valve 180, acts as a gas flow controlling element.

In operation, as the flow entering the pressure regulator from the supply pipe at the inlet 10 increases, gas flows past the open valve into the second compartment 130 where pressure increases and pushes the diaphragm 140 upward, against the force applied by the preset spring 150. As the diaphragm moves up, the valve eventually closes off the second compartment 130, preventing any further increase in pressure. When pressure in the second compartment decreases, for example due to the flow demand at the outlet increasing, the force of the spring 150 pushes the valve 180 down, thereby allowing flow from the inlet 10 to enter the second compartment and increase the pressure again. As the flow leaving the pressure regulator through outlet 20 increases, the pressure in the second compartment decreases, in turn letting the spring 150 push down on the diaphragm 140 and opening the valve 180.

As the flow entering the pressure regulator increases, the pressure builds in the second compartment, in turn moving the diaphragm 140 against the spring 150 and closing the valve 180. Accordingly, a nearly steady supply pressure can be maintained, provided that the pressure regulator is able to respond quickly enough to the flow changes, in both opening and closing directions. How quickly the regulator responds to the flow changes depends in part on the rate of change of pressure in the second compartment, i.e. how quickly the pressure can be increased or decreased in the second compartment. The rate of change of pressure in the second compartment is further related to the rate of change of pressure in the first compartment, i.e. how quickly air in the first compartment can be compressed or released from the first compartment to accommodate the upward movement of the diaphragm 140, before the spring force returns the diaphragm to a valve-open position. In an exemplary embodiment, as shown in FIG. 1, a safety vent or breather 165 is located in the first compartment, and allows air from the first compartment to be vented into a discharge piping system when the diaphragm moves up. Conversely, when the diaphragm moves down, breather air is drawn into the first compartment through the safety vent 165. The safety vent incorporates spring loaded two-way flappers and small bleed holes that provide for necessary dampening stability of the diaphragm 140, during operation of the pressure regulator. In an emergency condition where the diaphragm 140 may rupture, gas escaping from the second compartment 130 into the first compartment 120, is directed through safety vent 165 and the connected piping system to a safe discharge location. As an additional safety feature, some pressure regulators incorporate an internal over-pressure limiting relief valve, shown by spring 160 which holds closed the diaphragm pass-through valve 170. In the case of excess pressure occurring in second compartment 130, the resulting force on diaphragm 140 could over-come the combined closing forces of springs 150 and 160, opening valve 170, and venting excess gas safely through the discharge piping system as indicated on FIG. 1 by arrows 175.

Figure 2:
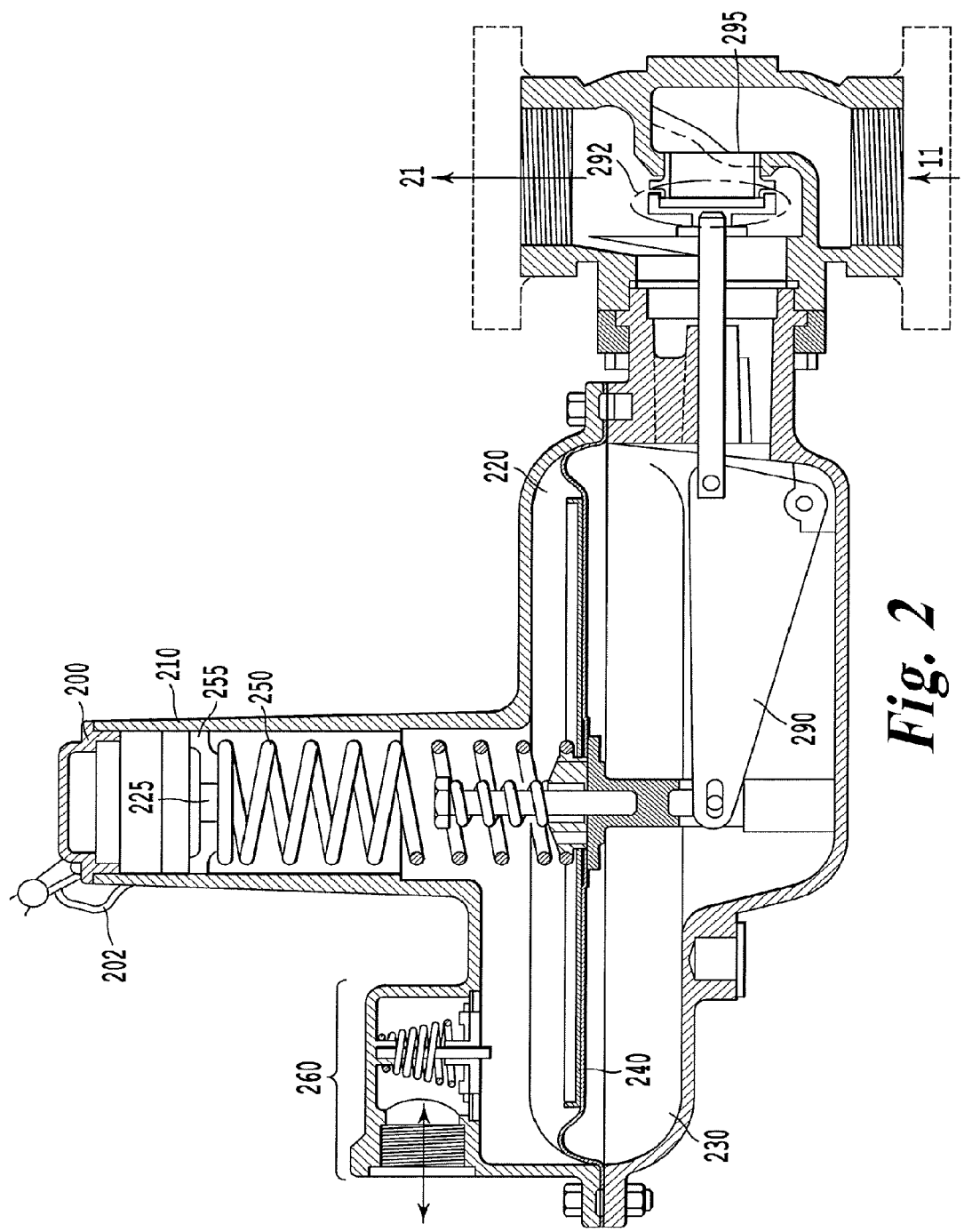
FIG. 2 is a cross-sectional view of a gas pressure regulator according to an embodiment of the invention.

Referring to FIG. 2, an exemplary embodiment of a pressure regulator includes elements similar to those of the simplified pressure regulator of FIG. 1.

In the exemplary embodiment of FIG. 2, a pressure regulator includes a first chamber with a first membrane or diaphragm 240 separating the chamber into a first compartment 220, and a second compartment 230. In an exemplary embodiment the flexible diaphragm 240 may be supported and sealed at its perimeter, and coupled to a valve mechanism 292. In an exemplary embodiment, the valve mechanism may be actuated by a linkage mechanism 290, which moves as a function of the pressure at the outlet 21, which communicates with second compartment 230 and the corresponding underside of diaphragm 240.

In the exemplary embodiment of FIG. 2, a vertically extending spring tower 210 encases a spring 250, which extends through the first compartment 220, and is closed off by a safety cap 200, augmented by a tamper evident mechanism 202. In an exemplary embodiment, flow enters the pressure regulator into the second compartment through the gas inlet 11 and valve and orifice 295. A safety vent and breather mechanism 260 is located in the first compartment, allowing air from the first compartment to be vented into a discharge piping system when the diaphragm 240 moves up.

During operation, the air in the first compartment 220 of the regulator is either pushed or pulled as the moving diaphragm 240 reacts to the downstream flow characteristics. In an exemplary embodiment, the volume of air present in the first compartment 220 exchanges slowly with ambient surrounding air through the safety vent mechanism 260, and through the associated gas discharge piping. As the air flow is forced in or out through the safety vent passages, the air may work against devices generating resistance such as spring loaded vent stabilizer flappers, and long piping lines. The resistance resulting from the vent and discharge system may limit the rate at which air can exit or enter the first compartment, effectively limiting the rate of change of pressure in the first compartment, and thus limiting the response of the regulator to variations in pressure. In an exemplary embodiment, when gas flow demand increases rapidly at the outlet 21, a low pressure will occur in compartment 230, causing the spring 250 to push the diaphragm 240 downward. In an exemplary embodiment, when air breathing in through the vent mechanism 260 is restricted, a vacuum is drawn in the first compartment 220. This vacuum slows the response motion of diaphragm 240 and also slows movement of the connecting linkage which opens the valve and orifice 295. Thus resistance from the system may impair the ability to meet a demand for increased outlet flow as rapidly as desired.

In an exemplary embodiment, to improve the response time of a pressure regulator, it may be possible to increase the pipe line size connected to the safety vent 260 to allow for faster breathing of the air in the first compartment. However, the safety vent diameter may not be increased past a certain threshold in order to avoid flutter in the diaphragm. Changes to the safety vent diameter may result in instability or ineffectiveness of the vent system.

Alternatively, it is possible to change the dampening and tuning characteristics of vent flappers and springs associated with the vent line to also allow for faster breathing of the air into the first compartment. These changes to the system may require expensive additional piping or re-piping of existing installations or may need to be accomplished at the regulator factory, likely requiring multiple iterations for the optimal tuning and to avoid instability at particular operating flows and/or an increase in lock-up pressure.

Leaving off the safety closure cap from the spring adjustment tower allows air in the unpressurized first compartment to freely exchange with the atmosphere. However, while a faster response can be obtained, this creates a potentially hazardous condition if noxious gas can escape into an uncontrolled environment, such as during emergency conditions.

Figure 7A:
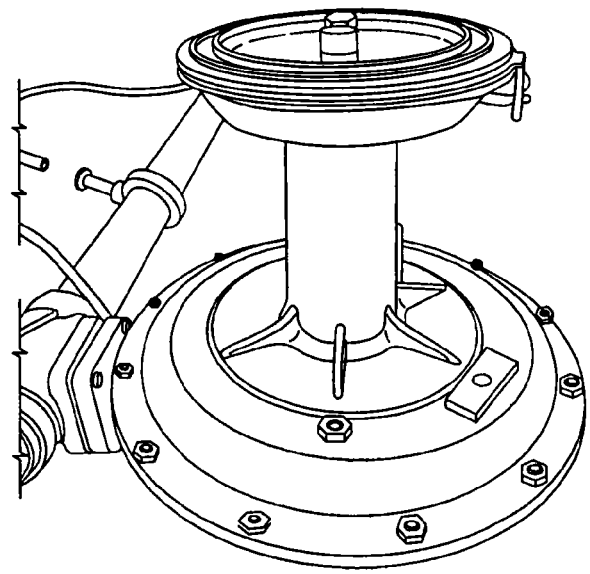
FIGS. 7A and 7B are isometric views of some exemplary embodiments of a gas pressure regulator with a second chamber.
Figure 7B:
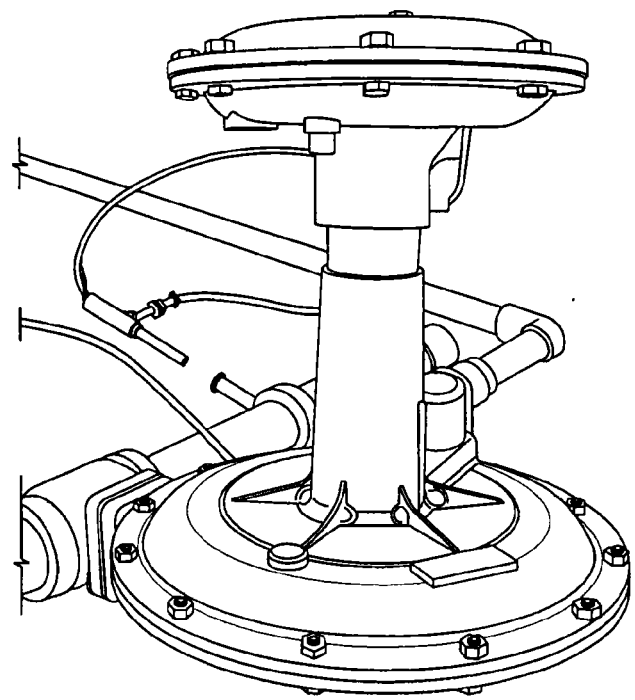

In an exemplary embodiment, a second chamber, also referred to as an add-on chamber, may be added on to an existing regulator. FIGS. 7A and 7B show exemplary embodiments of existing regulators with second chambers.

In an exemplary embodiment, the first chamber may have a volume between 75 and 350 cubic inches. In a non-limiting example, the first chamber may have a height between 1.5 and 3 inches. In an exemplary embodiment, the first membrane may have an outer diameter of 8 to 12 inches.

In an exemplary embodiment, the add-on chamber may provide an additional space for air exchanged with the regulator's first compartment to escape into or be drawn from. In a non-limiting example, the second chamber may have a volume between 20 and 100 cubic inches. In a non-limiting example, the second chamber may have a height between 0.75 inches and 2 inches, and the second membrane may have an outer diameter of 6 to 8 inches. In an exemplary embodiment, the membrane has sufficient space to flex and extend from a neutral position toward the bottom or top of the second chamber.

As noted above, how quickly a regulator responds to outlet pressure changes, due to downstream flow demand, depends in part on the rate of change of pressure in the second compartment, i.e. how quickly the pressure can be increased or decreased in the second compartment. The rate of change of pressure in the second compartment is further related to the rate of change of pressure in the first compartment, i.e. how quickly air in the first compartment can be drawn into or released from the first compartment to accommodate the movement of the first diaphragm 240 before the spring force resulting from the spring 250 and the forces resulting from the diaphragm 240 balance out, leaving the valve 292 in an equilibrium position. A safety vent may be located in the first compartment, allowing air from the first compartment to be vented into a discharge piping system when the diaphragm moves up, and allowing air to be drawn into the first compartment when the diaphragm moves down.

Figure 3:
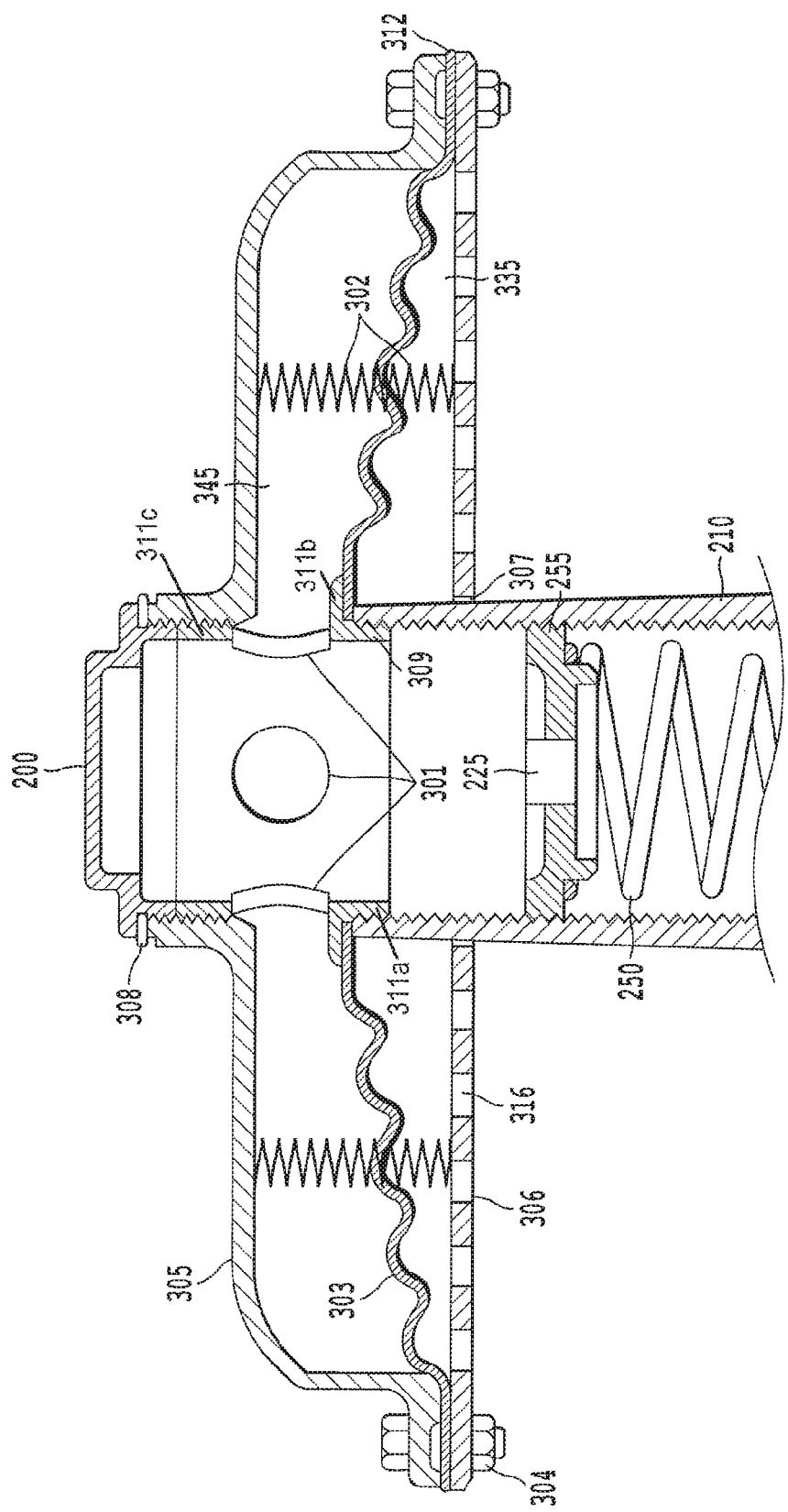
FIG. 3 is a cross-sectional view of a first exemplary embodiment of a second chamber connected to the spring tower of a gas pressure regulator.

In the exemplary embodiment of FIG. 3, a second chamber includes a second diaphragm 303. In this exemplary embodiment, a second chamber, also referred to as an add-on chamber, may be delimited by a casing 305 and a vent plate 306. The diaphragm or membrane 303 may seal and separate the second chamber into a third compartment 335 and a fourth compartment 345. In an exemplary embodiment springs 302 may be present on either side of the diaphragm 303. Referring to the exemplary embodiment shown in FIG. 3, changes to the outlet pressure of the gas regulator, induce movement of the first diaphragm, which in turn causes a corresponding movement of the second diaphragm and changes the pressure in the first compartment at a first rate which matches a second rate of pressure change in the fourth compartment. In an exemplary embodiment, the movement of the first diaphragm causes a corresponding movement of the second diaphragm, with the second diaphragm changing the volume of the fourth compartment and the volume of the third compartment. In a non-limiting example, the volume of the fourth compartment increases and the volume of the third compartment decreases. In an alternative embodiment, the volume of the fourth compartment decreases and the volume of the third compartment increases.

In this exemplary embodiment, the presence of the second chamber allows air in the first compartment to communicate with air in the fourth compartment at a rate which is at least equal to, and preferably higher than, a rate at which air enters or exits the first compartment via the vent breather system. In an exemplary embodiment a first rate of mass flow change in the first compartment may be equal to a second rate of mass flow change in the fourth compartment, caused by the movement of the first diaphragm. In an exemplary embodiment the first rate of mass flow change in the first compartment may be of the same order of magnitude as a second rate of mass flow change in the fourth compartment caused by the movement of the first diaphragm.

In an exemplary embodiment, the second chamber may be sealed by the safety cap 200 of the initial pressure regulator. In an exemplary embodiment, an O-ring 308 may be positioned between the casing 305 and the safety cap 200 to ensure the tightness of the seal. Accordingly, in an exemplary embodiment, an existing pressure regulator, also referred to as an off-the-shelf regulator can be modified by removing the safety cap from the spring tower, by connecting the second chamber to the spring tower with an adaptor 309, and by repositioning the safety cap 200 to seal the assembly. In an exemplary embodiment, the o-ring 308 and the safety cap 200 used may be elements from an original pressure regulator being modified.

Figure 4:
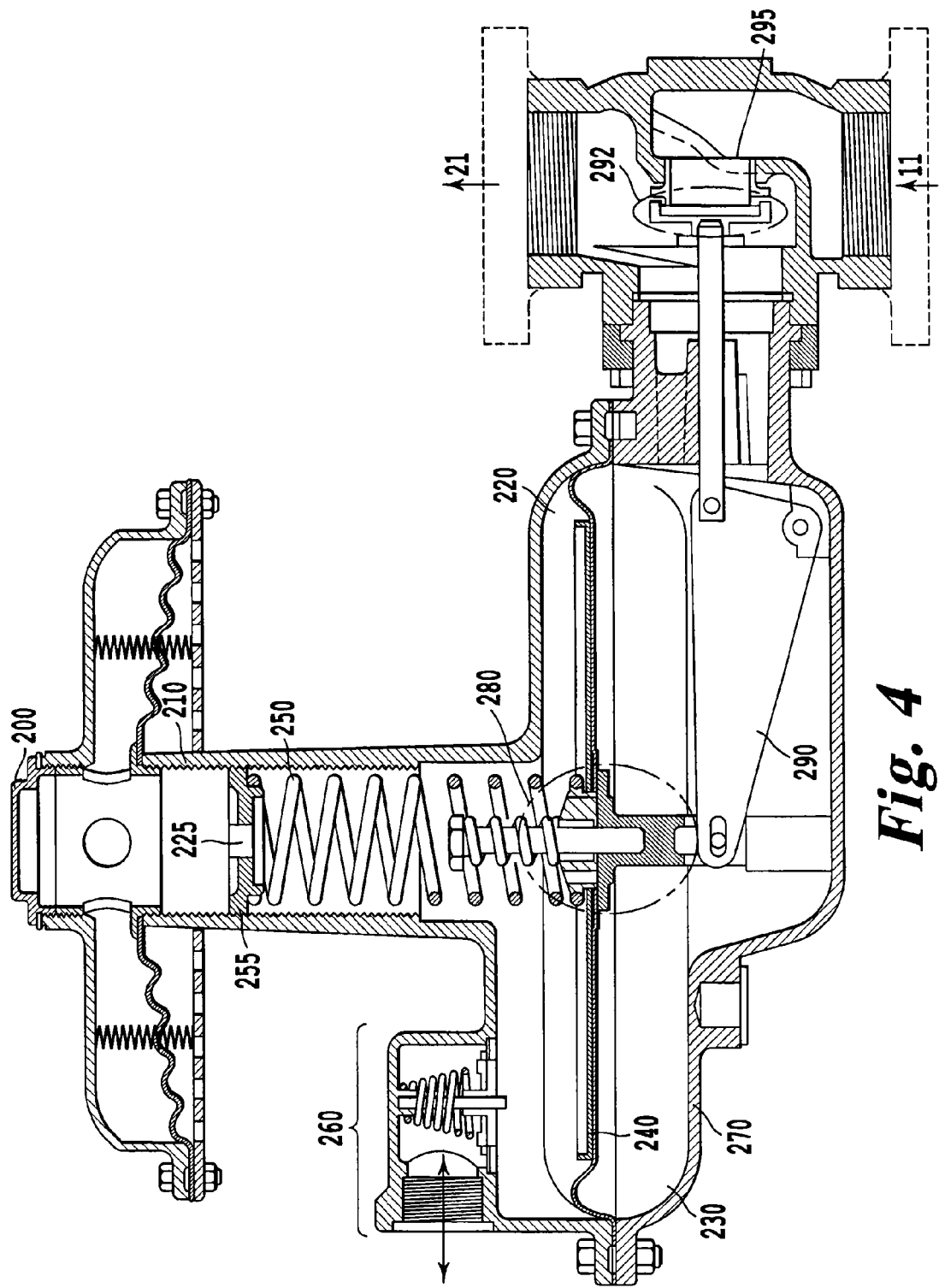
FIG. 4 is a cross-sectional view of a first exemplary embodiment of a second chamber connected to a gas pressure regulator.

In an exemplary embodiment, the second chamber may be connected to the spring tower 210 of an off-the-shelf pressure regulator, similar to the pressure regulator described above, and shown in FIG. 2. FIG. 4 shows an exemplary embodiment of the second chamber, connected to a pressure regulator.

In the exemplary embodiment of FIG. 3, the casing 305 of the fourth compartment 345 may be gas pressure containing and structurally supporting. In a non-limiting example, this casing 305 may be connected and sealed onto the first compartment of a pressure regulator by an adaptor 309. In an exemplary embodiment, the adaptor may use a screwed fitting or another appropriate coupling means.

In an exemplary embodiment, the adaptor 309 may be a mostly cylindrical piece, connecting the spring tower 210 and the casing 305. In an exemplary embodiment, the adaptor 309 includes a lower threaded vertical portion 311a with a first outer diameter 311b extending in a horizontal direction, an upper threaded vertical portion 311c with a second outer diameter and at least one opening 301 in the upper threaded vertical portion 311c. In an exemplary embodiment, the protruding lip 311b of the adaptor 309 may also pinch into place the membrane 303 at its inner diameter. At its outer diameter the membrane may be pinched between the vent plate 306 and the casing 305, both elements being held together by bolts 304, thereby providing a seal 312. In a non-limiting example the second membrane 303 may have an outer diameter between 6 and 8 inches. In an exemplary embodiment, the adaptor may include air breathing openings 301, allowing air from the first compartment to flow into the fourth compartment, and vice-versa, when the first diaphragm moves.

In an exemplary embodiment, the area of the air openings located on the adaptor is at least greater than the area of a smallest opening between the first and the fourth compartment. The area of the air openings may be referred to as an opening flow area, opening surface area, or opening area, all of which refer to the area of through holes present in the cross-section of an exemplary embodiment. In an exemplary embodiment, the flow direction is substantially perpendicular to a plane in which the openings are present. In one embodiment, the smallest opening is the opening 225 located at the center of a spring adjustment button 255. In an exemplary embodiment, the area of opening 225 is 0.25 square inches. In an exemplary embodiment, opening 225 is sized to provide an engagement for a square drive tool which allows for turning the spring adjustment button 255, and for setting the outlet pressure.

In an exemplary embodiment the air openings located on the adaptor have a combined opening area between 0.25 square inches and 0.6 square inches, preferably 0.38 square inches. In an exemplary embodiment, the air openings may be two holes with a diameter of at least 0.4 inches. In an alternate embodiment, the air openings may be three or four holes with a diameter of at least 0.4 inches.

In the exemplary embodiment of FIG. 3, the third compartment 335 of the second chamber may be delimited by vent plate 306, and vented to ambient air. In a non-limiting example, this third compartment 335 may be screened and protected from the entry of contaminants such as dirt, weather driven moisture or moving creatures such as insects, by the vented plate 306. In an exemplary embodiment, as shown in FIG. 3, the vented plate 306 may include openings 316, which allow air to freely enter or exit the third compartment 335. In an exemplary embodiment, the vent holes may be covered by screens or meshes. In an exemplary embodiment the vent holes may have a minimum cumulative flow area of 0.25 square inches, with a preferred cumulative flow area of 0.38 square inches. In an exemplary embodiment, the vent holes may have a cumulative flow area which is at least equal to the flow area of center opening 225. In an alternative embodiment, the vent holes may be evenly distributed over the vent plate. In yet another alternative embodiment, the vent holes may be circular, with a maximum diameter of substantially 0.1 inches. In an exemplary embodiment, the vent holes may have a minimum cumulative flow area which permits air breathing by movement of the second membrane to the atmosphere, at the same flow rate as the rate of air breathing through the air openings of the adaptor. In an exemplary embodiment, there may be a slight gap 307 between the vent plate and the outer surface of the spring tower 210.

In a non-limiting example, the vent plate 306 may also act as a support for the flexible diaphragm 303, supporting the diaphragm to avoid a rupture at a maximum emergency pressure of 25 psig. In an exemplary embodiment, the vent plate 306 may be made of aluminum. In an exemplary embodiment, the vent plate may be strong enough to support the second diaphragm pushing against the vent plate with up to 25 psig. In an exemplary embodiment, the maximum pressure which can be supported by the second diaphragm is at least 200 psi, significantly higher than the 25 psig maximum emergency pressure of the regulator.

In an exemplary embodiment, the membrane may be donut shaped. In an exemplary embodiment, flexible membrane 303 may be suspended in a neutral and mid-way position in the add-on chamber. In a non-limiting embodiment, opposing springs 302 may be used to push lightly on each side of the membrane. In an exemplary embodiment, the springs 302 may be wire wound or made of a soft foam material. In alternative embodiments other means of restoring the membrane to its neutral position may be used, including plastic or metal leaf springs.

In another exemplary embodiment, the membrane 303 itself may provide the functions of one or both of these neutral position return springs 302, whereas the inherent structure of the membrane may include means to return the membrane to its neutral position, such as concentric convolutions. In an exemplary embodiment, the membrane is both strong and flexible, with adequate dimensions. In an exemplary embodiment, the membrane may be an elastomeric membrane with molded concentric convolutions, fiber re-enforced, thin and flexible for optimum reaction, but very strong when pressurized and pushed against the vent plate. In an exemplary embodiment, membrane 303 may be a wave diaphragm. In an exemplary embodiment, the accuWAVE™ diaphragm, may be used for the second membrane. In an exemplary embodiment, the second membrane may exceed the burst strength requirements for gas regulator applications. In an exemplary embodiment, the second membrane may have over forty years of life on a gas meter on an average American home installation.

In an exemplary embodiment, during operation of the pressure regulator, the membrane 303 may be pulled or pushed away from its neutral position both freely and quickly. The reactiveness of the membrane 303 may be due to its flexible nature, to the presence of light springs 302, and to the vented plate 306 which allows air in the atmospheric-side compartment to exchange easily with the ambient surroundings. In an exemplary embodiment, as noted above, the membrane 303 may be protected from rupture by being backed up and supported by the casing 305 on one side, and the vent plate 306 or screen wire on another side.

In an exemplary embodiment, the volume of air in the first compartment of the pressure regulator may rapidly enter or exit the fourth compartment of the second chamber, instead of slowly entering or exiting via the vent breather system 260.

In an exemplary embodiment, the second chamber allows the regulator to safely provide a more constant supply pressure during transient periods when fast demand load changes occur. In an exemplary embodiment, a second chamber permits the quick and direct response of the regulator's moving parts to any rapid flow and pressure demand changes occurring in downstream piping, valving, and/or gas consuming equipment. An exemplary embodiment of the second chamber allows for a safe but improved regulator response, instead of simply exposing the regulator's atmospheric side to ambient air.

In an existing pressure regulator, in the event of an emergency relief of the internal gas from the regulator, due to either valve damage or first diaphragm rupture, a gas may escape to ambient surroundings. In an exemplary embodiment, the gas present in the pressure regulator system may be toxic or harmful. In an exemplary embodiment, in the event of an emergency relief, the flexible membrane 303 may contain the gas within the fourth compartment and the first compartment. In an exemplary embodiment, the flexible membrane 303 may force the escaped gas to travel through the required vent piping to a safe dispersion location. In the event of a first diaphragm 240 rupture, an exemplary embodiment of the second chamber may prevent direct outflow by directing the flow to the vent system 260.

Figure 5:
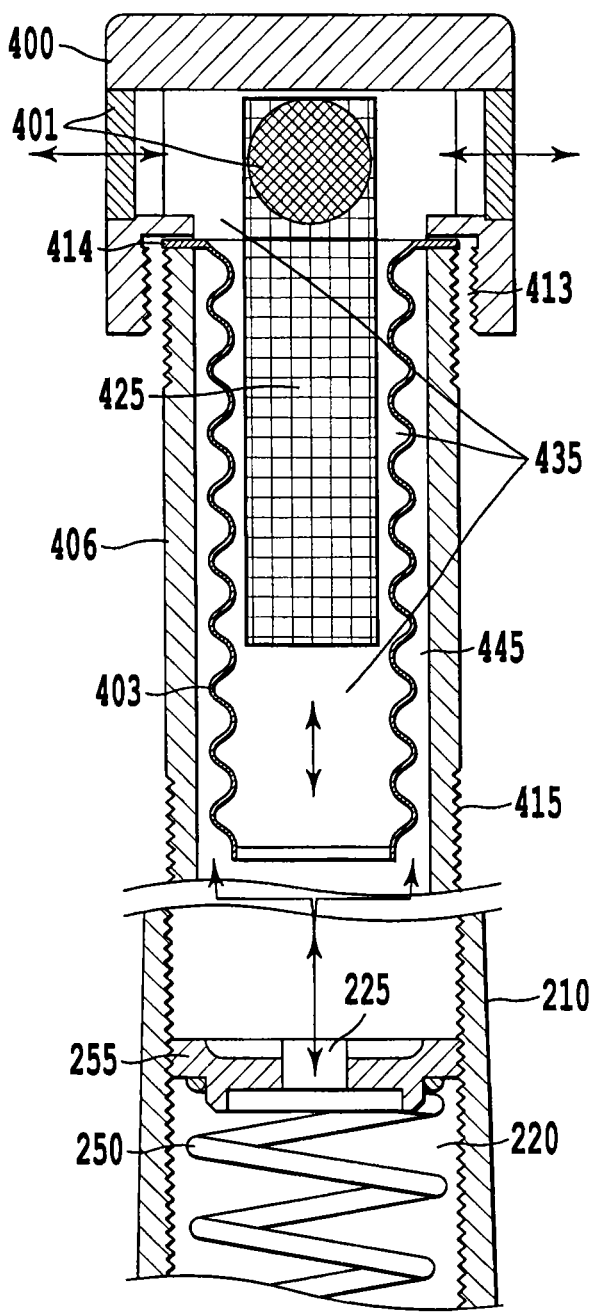
FIG. 5 is a cross-sectional view of a second exemplary embodiment of a second chamber.
Figure 6:
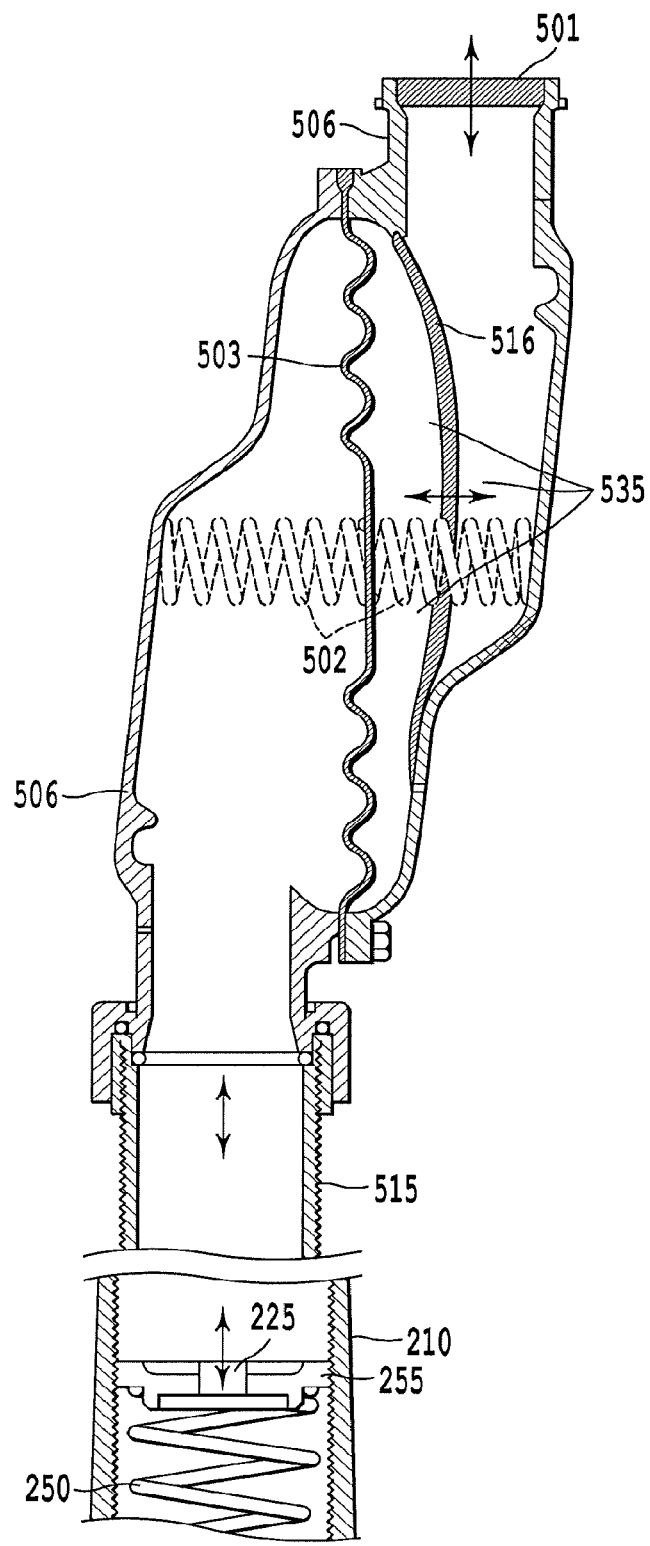
FIG. 6 is a cross-sectional view of a third exemplary embodiment of a second chamber.

FIGS. 5 and 6 show alternative embodiments of a second chamber. Referring to FIG. 5, an alternate exemplary embodiment of a second chamber is shown, and may be connected to a spring tower 210 including a spring 250 by threads 415, or any other connecting means.

In the exemplary embodiment of FIG. 5, the add-on chamber includes a casing 406, with the outer diameter of the membrane which may be fixed by pinching between the casing 406 and the safety cap 400, and by having a seal such as an O-ring 414. In an exemplary embodiment, the safety cap 400 can be threaded onto the casing 406 by means such as threads 413. The exemplary embodiment of FIG. 5 further includes a second membrane 403, and screened vents 401. The fourth compartment 445 is separated from the third compartment 435 by the membrane 403. The shape of this membrane is a cylindrical boot with annular convolutions and end closed off near the threads 415. In the exemplary embodiment shown in FIG. 5, breathing openings 401 allow air from the third compartment to exchange freely with the atmosphere, when the first diaphragm moves and which causes the membrane 403 to move. In this exemplary embodiment, the openings 401 are screen covered to prevent debris from the atmosphere to enter the system.

In the exemplary embodiment of FIG. 5, a tube 425 acts as a vent plate to prevent the membrane 403 from moving too much or collapsing without recovery, always allowing the membrane 403 to return to a neutral position. In an exemplary embodiment, the tube 425 may be made of a screen mesh or a perforated tube with multiple holes. The paths for air movement are shown in FIG. 5 by two-headed arrows in compartments 445 and 435.

In an exemplary embodiment, the membrane 403 allows air pressure in the regulator's first compartment to quickly equalize with the atmospheric pressure by moving both axially and radially, in either direction. In this exemplary embodiment, no mass crosses the membrane boundary. In the exemplary embodiment shown in FIG. 5, air in the first compartment 220 communicates directly with the air in the fourth compartment 445 through the center hole 225 in the spring adjustment button 255.

In an exemplary embodiment to access the adjustment spring 250, for example to adjust the spring force, the add-on chamber device may be removed as a whole by unscrewing at threads 415.

Referring to FIG. 6, an alternate exemplary embodiment of a second chamber is shown, and may be connected to a spring tower 210 including a spring 250, by threads or similar means located on the adaptor 515. In the exemplary embodiment of FIG. 6, the second chamber includes a casing 506, a membrane 503, along with restorative means 502, such as springs or foam, and a vent plate 516.

In an exemplary embodiment, vent plate 516 may be a wire mesh or a perforated plate, and provides a backup support for the membrane in the event of over-pressurization. Screened vent 501 prevents bugs and outside debris from entering the third compartment 535. In an exemplary embodiment, the orientation of the screened vent 501 may be configured to best avoid elements such as rain, sleet, snow or sand from entering the system.

Because many possible embodiments may be made of the invention without departing from the scope thereof, it is to be understood that all matter herein set forth or shown in the accompanying drawings is to be interpreted as illustrative and not in a limiting sense.

The invention claimed is:

1. A gas pressure regulator for regulating a pressure of a gas system, the gas pressure regulator comprising:
a first chamber;
a first diaphragm separating the first chamber into a first compartment and a second compartment;
a second chamber;
a second diaphragm separating the second chamber into a third compartment and a fourth compartment, the fourth compartment being connected to, and in communication with, the first compartment of the first chamber;
a movement of the first diaphragm causes a corresponding movement of the second diaphragm that changes a first volume of the fourth compartment and a second volume of the third compartment; and
a vertically extending adapter connecting the first compartment of the first chamber to the fourth compartment of the second chamber, the adapter including
lower and upper threaded vertical portions,
at least one opening in the upper threaded vertical portion through which the first compartment and the fourth compartment communicate, and
a lip extending in a horizontal direction,
wherein an outer diameter of the lower threaded vertical portion matches an inner diameter of a vertically extending portion of the first compartment, an outer diameter of the upper threaded vertical portion matches an inner diameter of the second chamber, and an opening area of the at least one opening is greater than an opening area of a smallest opening between the first compartment and the fourth compartment.

2. The gas pressure regulator of claim 1, further comprising:
a vent breather valve located in the first compartment that exhausts air from the first compartment into the surrounding atmosphere, or draws air into the first compartment from the surrounding atmosphere,
wherein the vent breather valve exhausts or draws in air from the first compartment at a maximum vent breather valve exhaust rate when an air pressure in the first compartment reaches a predetermined threshold.

3. The gas pressure regulator of claim 1, wherein:
the at least one opening exchanges air between the first compartment and the fourth compartment at a rate greater than a maximum vent breather valve exhaust rate.

4. The gas pressure regulator of claim 1, wherein:
the opening area of the at least one opening is between 0.25 square inches and 0.6 square inches, the opening area preferably being 0.38 square inches.

5. The gas pressure regulator of claim 1, further comprising:
at least one spring connected to an upper surface of the second diaphragm, and to an upper surface of the second chamber; and
at least one spring connected to a lower surface of the second diaphragm, and to a lower surface of the second chamber.

6. The gas pressure regulator of claim 1, wherein:
an inner diameter of the second diaphragm is securely pinched between a top surface of the first compartment and the adaptor lip; and
an outer diameter of the second diaphragm is securely pinched by at least one fastener between an upper surface of the second chamber and a bottom surface of the second chamber.

7. The gas pressure regulator of claim 1, wherein:
a distance measured along a surface of the second diaphragm between the inner diameter and the outer diameter of the second diaphragm is greater than a distance between an outer diameter of the second chamber and an outer diameter of the spring tower of the first compartment.

8. The gas pressure regulator of claim 1, further comprising:
a safety cap with a threaded radial portion matching the inner diameter of the second compartment, and a horizontally extending lip pressing down on a sealing element, the safety cap seals the second chamber to the atmosphere, and the safety cap can withstand pressures of up to 25 psi.

9. The gas pressure regulator of claim 1, the second chamber comprising:
an upper shell with a first radial inner section, a second horizontal section, and a third radial other section; and
a lower annular horizontal plate,
wherein the first radial inner section is connected to the upper threaded vertical portion of the adaptor, and an inner diameter of the lower annular horizontal plate is greater than an outer diameter of the spring tower of the first compartment.

10. The gas pressure regulator of claim 9, wherein:
the lower annular horizontal plate includes air openings in communication with the atmosphere.

11. The system as claimed in claim 10, wherein:
the air openings have a minimum cumulative opening area of 0.25 square inches, and a preferred cumulative opening area of 0.38 square inches.

12. The system as claimed in claim 11, wherein:
the air openings are circular openings and are evenly distributed over the lower annular horizontal plate.

13. The gas pressure regulator of claim 1, wherein the movement of the second diaphragm increases a first volume of the fourth compartment and decreases a second volume of the third compartment.

14. The gas pressure regulator of claim 1, wherein the movement of the second diaphragm decreases a first volume of the fourth compartment and increases a second volume of the third compartment.

15. A gas pressure regulator for regulating a pressure of a gas system, the gas pressure regulator comprising:
a first chamber;
a first diaphragm separating the first chamber into a first compartment and a second compartment;
a second chamber;
a second diaphragm separating the second chamber into a third compartment and a fourth compartment, the fourth compartment being connected to, and in communication with, the first compartment of the first chamber;
a movement of the first diaphragm causes a corresponding movement of the second diaphragm that changes a first volume of the fourth compartment and a second volume of the third compartment;
at least one spring connected to an upper surface of the second diaphragm, and to an upper surface of the second chamber;
at least one spring connected to a lower surface of the second diaphragm and to a lower surface of the second chamber; and
a lower horizontal vent plate of the second chamber limits the displacement of the second diaphragm.

16. The gas pressure regulator of claim 15, wherein:
a speed of movement of the second diaphragm is regulated at least by a rigidity of the second diaphragm and by a rigidity of the at least one spring, and a rate of exchange of air with the atmosphere through openings in the lower horizontal vent plate.

17. A method for regulating a pressure of a gas system with a gas pressure regulator comprising:
mounting a regulator with a first chamber, a first diaphragm, a vent breather valve and a safety cap on a pressurized system, the first diaphragm separating the first chamber into a first compartment and a second compartment, the vent breather valve being located in the first compartment and the safety cap sealing the first compartment;
removing the safety cap while the pressurized system is operating;
connecting a second chamber to the first chamber via an adaptor, the second chamber including a second diaphragm separating the second chamber into a third compartment and a fourth compartment, the fourth compartment being connected to, and in communication with, the first compartment;
replacing the safety cap above the second chamber; and
operating the pressurized system,
wherein during operation of the pressurized system, a movement of the first diaphragm causes a corresponding movement of the second diaphragm that changes a volume of the fourth compartment.

18. A gas pressure regulator for regulating a pressure of a gas system, the gas pressure regulator comprising:
a first chamber;
a first diaphragm separating the first chamber into a first compartment and a second compartment;
a second chamber;
a second diaphragm separating the second chamber into a third compartment and a fourth compartment, the fourth compartment being connected to, and in communication with, the first compartment of the first chamber;
a movement of the first diaphragm causes a corresponding movement of the second diaphragm that changes a first volume of the fourth compartment and a second volume of the third compartment; and
an adapter connecting the first compartment of the first chamber to the fourth compartment of the second chamber, the adapter including a horizontally extending lip, and an inner diameter of the second diaphragm is securely pinched between a top surface of the first compartment and the adapter lip.

* * * * *